United States Patent Office 2,864,776
Patented Dec. 16, 1958

2,864,776

PROCESS FOR PREPARING SHEETS OF ANION EXCHANGE RESIN

Yoshio Tsunoda, Shibuya-ku, Tokyo, and Maomi Seko, Okatomi, Nobeoka-shi, Japan, assignors to Asahi Kasei Kogyo Kabushiki Kaisha, Osaka, Japan No Drawing. Application April 16, 1956
Serial No. 578,161

Claims priority, application Japan May 6, 1955

1 Claim. (Cl. 260—2.1)

This invention relates to the synthetic anion exchange resins of large dimensions which are not cracked in any process of their production. The present invention relates to anion exchange resin prepared from the base polymer matrix comprising monovinyl arene compound and polyolefinic compound and any other monovinyl compound, and said matrix bonded to anion exchange group through alkylene bridge after haloalkylating and aminating said matrix.

This invention relates especially to anion exchange resins having at least two dimensions each in excess of 1 cm., having a shape of sheet, rod, tube etc., which are not cracked during the process of haloalkykation and amination and are particularly excellent in electric-chemical properties.

There were known many synthetic anion exchange resins, but these materials are granules of small particle size, usually considerably below than 1 cm. in diameter. These granular resins have been used in such a system wherein they were either contacted with an electrolytic solution until equilibrium has been reached or the solution has passed through a stationary bed of ion exchange resin granules. The object of using such granular resins was to adsorb anions from the liquid. Therefore, anion exchange resins of large dimensions were not necessary.

The ion exchange resins having at least two dimensions each in excess of 0.8 cm. were described in the U. S. Patent No. 2,636,851 of W. Juda and W. A. MacRae. But in this patent, there is no description about the homogeneous membrane prepared from styrene and divinylbenzene.

In general, the usual base polymer matrix of an anion exchange resin is an insoluble and infusible copolymer comprising monovinyl arene compound and polyolefinic compound. A primary, secondary or tertiary amine is bonded to said matrix through an alkylene bridge (U. S. Patent No. 2,614,099; 2,591,574; 2,591,573; 2,597,439 and 2,597,440).

According to these literatures the following are the cases wherein fractures are caused in making anion exchange resin membranes having at least two dimensions each in excess of 1 cm. (U. S. Patent No. 2,616,877).

(1) The process of copolymerization of base polymer matrix comprising monovinyl arene and polyolefinic compound monomers.

(2) The process of haloalkylating said polymer matrix and of aminating said haloalkylated matrix.

(3) The process to drain-off and wash out the chemicals after haloalkylation and amination and to exchange the anions.

Therefore, the anion exchange resin having large dimensions could not be prepared by applying the usual known methods. These situations are exemplified more in detail in the preparation of the anion exchange membrane from styrene and divinylbenzene. In order to prepare the anion exchange membrane, it is necessary to make first membrane type base polymer matrix of styrene-divinylbenzene. Under conditions similar to those of the manufacture of granular styrene-divinylbenzene copolymer, cracks were easily caused during the polymerization. Particularly, in obtaining unfractured sheet form styrene-divinylbenzene base polymer matrix by means of a rectangular hexahedral polymerizing vessel wherein two surfaces of large areas are set opposite each other with a clearance of less than 1 mm. in between, cracks or occurrence of heterogeneous parts in polymer matrix are easily caused during the polymerization. In a rare case, a crackless sheet form base polymer matrix could be obtained by polymerizing the monomer for a long time in said polymerizing vessel at a temperature lower than usual. But the sheet thus obtained could never be haloalkylated and aminated without fracture by the hitherto publicly known method, because the styrene-divinylbenzene sheet form copolymer, obtained by polymerizing the monomers in the polymerizing vessel having such a narrow clearance, is influenced by the walls of the vessel in the course of the polymerization. It is generally well known that the polymer is easily and seriously influenced by the walls of the polymerizing vessel in the course of the vinyl polymerization. The composition of the present invention always contains the polyolefinic compound and the gelation can not be avoided. It is not possible for the polymerization to apply stirring, which is different from the known suspension polymerization. Surface zone contacting to the wall of polymerization vessel is quite different from the interior of the vessel. In order to avoid such disadvantage, it is forced for the manufacture of homogeneous sheet to employ thin vessel. Even if a membrane of small area were obtained by the copolymerization of styrene and divinylbenzene, stresses at the duration of the later chemical treatment in introducing ion exchange groups would result fractures and cracks because of the non-uniformity of the membrane of said base polymer matrix. It was difficult to obtain anion exchange resin sheet having large dimensions. Further, in general, fractures are readily to occur after haloalkylation and amination. When anion exchange resin membrane is immersed in water to have excess chemicals removed after haloalkylation and amination, it is rapidly crushed into smaller pieces. In making anion exchange resin membrane, the chemicals must be removed very carefully, that is to say, washing off of the chemicals must be done very carefully. Therefore the resin must be washed several times by using the several batches of the solution of gradually decreasing concentration. Further, this process usually requires several weeks. These circumstances are mentioned in U. S. Patent No. 2,616,877, from which it will readily be understood that production of homogeneous anion exchange membrane from styrene-divinylbenzene copolymer has been failed.

We have now discovered that, if a plasticizer is added in the copolymerization of monovinyl arene and polyolefinic compound and, if desired, any other monovinyl compound, stresses and strains during the polymerization are easily released, and therefore, if a large block of a copolymer is made by solution polymerization with plasticizer. We can use the block type polymer, from which thin sheets form base polymer matrix for the preparation of anion exchange membranes is obtained. The block is scarcely injured except the surface zone of restricted thickness and, therefore, almost all block and the worked sheet form matrix therefrom free from the injuriously polymerized part by wall. This is quite different from the sheet which is obtained in a hexahedron form vessel having narrow clearance between both walls. So we can obtain the anion exchange membrane quite free from the cracks and fractures which have ever been produced in the courses of polymerization, introducing of ion exchange groups, washing etc. Besides the block form polymer matrix comprising a plasticizer of this invention is easily worked into any shape including sheet and also pipe. Moreover, the plasticizer of this invention has quite unique characteristic for the preparation of ion exchange resin having large dimensions. The addition of plasticizer controls the polymerization reaction smoothly and the stress in the final block polymer is released.

Generally, known literature shows that, when the large block polymer is prepared from styrene, the large container is necessary; overheating can not be avoided in the center of the large container because of exothermic nature of polymerization; this overheating produces uneven product whose center is different from outside parts of the block polymer, such unevenness causing the fracture in the step of polymerization or introduction of anion exchange groups. Known literature also shows that maximum container diameter which can be used in order to keep the differential temperature between the center of container and outside bath temperature within 10 to 20° C., and at the temperature of 100° C. of polymerization bath the maximum container diameter is 2 inch for styrene. (Ray H. Boundy "Styrene," 1952, Reinhold Publishing Corp., pages 269–270.) When the polyolefinic monomer is added to styrene in the present case, the rate of polymerization and its exothermic nature are more vigorous, the block form base polymer matrix of anion exchange resin can not be obtained without unevenness. In this invention the plasticizer is always added with monovinyl monomer and the polyolefinic monomer, and the concentration of monomer is diluted with plasticizer, therefore exothermic nature and the rate of polymerization are so improved and thus obtained base polymer matrix is quite free from uneven characteristics, however large the block may be. Although the volume and density of plasticizer never change before, during and after polymerization, those of monomer used to polymerization change its volume and density during polymerization. Therefore, the addition of plasticizer makes the final block and sheet polymer matrix having large dimensions free from any cracks and fractures because of the shrinkage of volume of polymerization. Moreover the plasticizer has a function of solvent and swelling agent of the polymer of the monomeric compound, and, therefore, the existence of plasticizer makes the polymer uniform. And the existence of plasticizer keeps the final polymer in a swollen state, so the final polymer is easily penetrated into with the reagent for introducing ion exchange group after working into desired shape, that is, is easily chloromethylated and aminated without any cracks and fractures in any steps of the manufacture thereof.

When, as in this invention, the copolymer is prepared in another state by plasticizer to a volume equal or near to that occupied after the anion exchange groups are introduced and then by introducing the anion exchange groups the electrochemical properties of the resultant anion exchange resin are remarkably improved due to the high density of the base polymer matrix.

The concrete method of this invention is as follows.

A monovinyl arene and polyolefinic compound and further, as required, any other monovinyl compound are mixed together. A plasticizer is added to said mixture with or without the addition of a catalyst. The mixture is then subjected to solution polymerization with plasticizer in an atmosphere from which oxygen has been removed. In this polymerization, a third substance having nothing to do with the polymerization can be added so as to reinforce the base polymer matrix to be obtained. The polymerizate can be effected in a shape similar to that of the wanted anion exchange resin by solution polymerization with plasticizer which can be worked into any shape by means of a cutter and a lathe after the polymerization. At this time, as the plasticizer is contained in said base polymer matrix, it gives proper softness and elasticity to the working and molding and is therefore very advantageous. Particularly, in making anion exchange resin membrane in the presence of a plasticizer, it is possible to cut a block form substance obtained by copolymerization into thin membrane matrix by means of a planer and a lathe. The plasticizer may or may not be extracted from the thus obtained worked base polymer matrix by means of a solvent. The reagent used in the extraction is solvent which will swell the base polymer matrix or which can not swell the base polymer matrix but will extract only the plasticizer. In manufacturing an anion exchange resin, this process of extracting the plasticizer may be omitted but it will be economically advantageous to re-use to extracted plasticizer. The thus obtained base polymer matrix is haloalkylated in the following process and the haloalkyl groups are introduced into said polymer matrix by usual method. The haloalkylation is effected by haloalkylating agent such as an aldehyde and a halogen acid (for example, paraformaldehyde and hydrochloric acid) or a dihaloalkan and Friedel-Crafts catalyst (for example, ethylene dichloride and aluminum chloride) or a haloether and Friedel-Crafts catalyst (for example, the following chlorodimethylether, zinc chloride or aluminum chloride) with or without existence of solvent. The thus obtained halo-alkylated base polymer matrix is reacted with tertiary amine or other weakly basic amines to bond the amine groups through alkylyen bridge. At this time, if a tertiary amine is used, said anion exchange resin becomes a strongly basic anion exchange resin of the tertiary ammonium type and, if a secondary amine or other weaker amines are used, said resin becomes a weakly basic anion exchange resin. At the time of this aminating reaction, said matrix is sufficiently swollen with a swelling agent. The cracks caused by non-uniformity of swelling can be avoided. Also, even if the resin is thrown into an aqueous solution after amination, no cracks are caused. Thus, an anion exchange resin having at least two dimensions each in excess of 1 cm. can be made without causing cracks.

In the above processes, the monovinyl arene compound is selected from benzene and naphthalene series, i. e., they contain not more than 10 carbon atoms in the aromatic nucleus, which monovinyl arene compound may contain in addition to the vinyl radical 1 to 3 halogens or lower grade alkyl groups other than the tertiary alkyl radical, attached to the aromatic nucleus. The alkyl substituents are selected preferably from methyl radical. Examples of such monovinyl arene compound are styrene, α-methylstyrene ar-methylstyrene, ar-dimethylstyrene, ar-ethylvinylbenzene, ar-chlorostyrene, vinylnaphthalene, ar-methylvinylnaphthalene, ar-secondary butylstyrene and ar-trimethylstyrene. The polyolefinic compounds are selected from the compounds in which polymerizable double bond exists at least two in one molecule. Examples of such polyolefinic compound are divinylbenzene, ar-divinyltoluene, ar-divinylxylene, ar-divinylchlorobenzene, divinylnaphthalene, ar-divinylethylbenzene, divinylether and trivinylbenzene, butadiene, isoprene, bimethallyl, biallyl, divinylether, cyclopentadiene and polyolefinic hydro-carbons similar thereto.

If the polymerizate comprises further monovinyl compound having no functional groups which are convertible into anion exchange groups, the swelling of the polymerizate is reduced. Accordingly, the addition of such monovinyl compound is useful from preventing the cracking of the base polymer matrix. For the monovinyl compound to be added, therefor, methylmethacrylate, ethylacrylate, α-chloroethylacrylate, diethylmaleate, vinylchloride, vinylidene chloride, vinyl acetate, methylvinylketone and methylvinylether can be used.

As the plasticizer, phosphoric acid esters such as tricresylphosphate, trioctylphosphate, diphenyloctylphosphate, benzene-diallylphosphate and trichlorethyl phosphate, phthalic acid esters of alcohols such as dimethylphthalate, diethylphthalate, dibutylphthalate and dioctylphthalate, phthalic acid esters such as butylbenzylphthalate, tetrahydrophthallylalcoholester, tetrachlorphthalicacidester and phthalic acid derivative esters, polyglycol esters such as polyethyleneglycol, α-ethylcapronic acid ester, polyethyleneglycollauric acid ester and hexanetriol ester, sebacic acids such as sebacic acid 2-ethylhexyl ester, oxyacid esters such as adipic acid ester, chlorinated paraffin, alkylsulphonic acid phenylester, citric acid ester, ricinoleic acid ester and oxybenzoic acid ester and hetero dibasic acid esters such as dithiodiglycolic acid ester, methylenebisthioglycolic acid ester, carboxymethylmercaptsuccinic acid ester and propiolactone can also be used. Moreover low molecular weight polymerizate of monovinyl compound having limited degree of polymerization such as poly-α-methylstyrene (degree of polymerization 3-10) are also available.

In the polymerization of the base polymer matrix, more than 10% by weight of total polymerizable compound is monovinyl compound. It is preferred that the monovinyl compound constitutes 40%–99% by weight of total polymerizable compound. In monovinyl compound, monovinyl arene compound is greater or almost all part, and monovinyl aliphatic compound which is not combined by amino groups through alkylen bridge is added if necessary. And, less than 60% by weight of total polymerizable compound is polyolefinic compound, and it is preferred that the amount of polyolefinic compound is from 0.1% to 50% by weight of polymerizabe compound. The amount of plasticizers is 1 to 60% by weight of total solution, and in order to obtain the proper characteristics in working and cutting a block form product after the copolymerization, about 20 to 60% of the plasticizer is preferable. Substances having nothing to do with the polymerization, for example, glass fibers can be added as reinforcements.

The polymerization is carried out generally at a temperature of 40 to 150° C. with or without using a catalyst. Gelation always occurs in the early stage of the polymerization due to the copolymerization of polyolefinic compound. Therefore, stirring cannot be carried out as in the ordinary suspension polymerization and non-uniform parts are likely to be caused in the polymerization. Particularly, in obtaining large block of polymer, when the polymerization starts locally and a non-uniform polymer is produced, the temperature of that part only does rise, and accelerate to more non-uniform polymerization. This tendency is especially so remarkable in the early stage of the polymerization that it is essential to prevent non-uniform polymerization in the early stage by raising polymerization temperature step by step from a low temperature.

The vinyl polymerization of the above base polymer matrix can be promoted by using a publicly known catalyst. Such catalysts are ozone and peroxide compounds represented by ozonide and peroxide, e. g. organic peroxide compounds such as acetyl peroxide, stearoyl peroxide, tertiary butyl peroxide, benzoyl peroxide, tertiary butyl perbenzoate, ditertiary butyl diperphthalate, ditertiary butyl hydroperoxide and lauroyl peroxide, inorganic substances such as barium peroxide, sodium peroxide and hydrogen peroxide and water-soluble so-called per compounds such as, for example, soluble perborate, persulphate and perchlorate. The amount of 0.1 to 2% of a catalyst based on weight of monomer is proper. In making an anion exchange resin in the form of a sheet, pipe or bar, it is better to cut a mass of a large shape into thin sheets, bars and pipes by means of planers, lathes or any other machines. In the case of the method of this invention, a proper amount of a plasticizer is always mixed in. Therefore, the product can be very conveniently cut or worked into any shape generally at a room temperature. It is however, also possible to cut it at a temperature of 0 to 150° C. In general, it is conveniently worked at 10 to 80° C. from the point of view of the hardness.

The plasticizer is extracted, if necessary, from the copolymer after being worked. The plasticizer can also be automatically extracted or decomposed by a reagent used in the later process and may be lost. The solvents used in the extraction in such case are xylene, toluene, trichloroethylene, thiophene, cyclohexanone, perchloroethylene, pyridine, propyrene oxide, pyrol, dichlorobenzene, bromobenzene, tetraline, chloroform, carbon tetrachloride, benzene, dioxane, isoboron, morphorine, methylethylketone, ethyl acetate, methyl-n-amylketone, propyrene oxide, carbon disulphide, tetraline, ester acetate and others which are solvents both for linear polystyrene and for the plasticizer which are swelling agent for base polymer matrix, phenylcyclohexene, tetrachlorethane, vinylidene chloride, styrene, phenyl acetylene, dichloroethylene, tetrahydrofurane, triethylbenzene, ethylidene chloride, 1.1-dichloro-1-nitroethane, nitrobenzene, aniline, diethyl carbonate, ethylchlor acetate, varrelol acetone, propyrene oxide, ethyl laurylate, amylacetate, cyclohexane, ethylstearate, acetone, diethyletetrachlorobenzene, ethylbenzene, chlorobenzene, diethylbenzene, dibutyl phthalate and tricresyl phosphate which are solvents poor to polystyrene but serve as solvents for plasticizers and heptane, nitromethane, hexane, decane, methanol and ethanol which have little solubility for polystyrene but have ability to extract plasticizers. Such solvents for the plasticizer may be properly changed and used according to the density of the base polymer matrix to be used. That is to say, in the case of a polymer matrix of a structure easy to extract, a non-solvent of polystyrene may be used. In the case wherein a plasticizer of a high density is difficult to extract, a solvent which has ability to swell and dissolve polystyrene will be used. The extracting temperature is the normal temperature to the reflux temperature of the solvent. The thus extracted transparent crankless base polymer matrix of any shape is then haloalkylated. The addition of plasticizer in base polymer matrix in their polymerization and their extraction after polymerization promote the reactivity of said base polymer matrix for introducing of ion exchange groups.

The base polymer matrix obtained by the above-mentioned method is haloalkylated and then aminated. The haloalkylation involves introducing into the polymer matrix a plurality of bromoalkyl or chloroalkyl groups having the general formula $C_nH_{2n}X$ wherein $n$ is an integer 1 to 4 and X represents fluorine or chlorine. While groups containing one to four carbon atoms are involved in this invention, it is preferred to use those compounds in which chloromethyl group $—CH_2Cl$ is bonded to the polymer matrix because the chloromethylated products are by far the most reactive. The carbon atoms in the group of $—C_nH_{2n}X$ may be in a straight chain or a branched chain. The polymer matrix is haloalkylated by various way. For example, the polymer may be reacted with mixture of aldehyde and hydrochloric acid or mixture of dihalide and Friedel-Crafts catalyst. The introduction of halomethyl group is carried out most preferably when the polymer is reacted with chloromethylether or bromomethylether in the presence of such catalyst as zinc chloride, zinc oxide, tin chloride, aluminum chloride, tin, zinc or iron. Methods of chloroalkylating which may be used for introducing the $—CH_2Cl$ group and which also serve as guides for introducing $—C_2H_4X$, $C_3H_6X$, and $C_4H_8X$ groups are described in "Organic Reactions," vol. I, chapter 3, page 63 et seq. (John Wiley & Sons Inc. N. Y. C. 1942).

The halomethylating reaction will easily occur at a temperature —25 to 120° C. or higher. This reaction is carried out by swelling the polymer with an organic solvent which is less reactive on the haloalkylating agent than such polymer as tetrachloroethylene, chlorobenzene or an excess haloalkylating agent. The reaction is advantageously carried out to the point at which the resin product contains an average of at least one halomethyl radical per six aromatic nuclei and is continued until the product contains an average of 0.8 to 1.2 halomethyl groups per one aromatic nucleus. After the halomethylating reaction, the resin is washed with water or other solvent such as acetone. The halomethylated resin can be used either in wet or dry. If the monovinyl compound in this invention contains one or more alkyl groups, the polymerizate can be haloalkylated by the halogenation of said alkyl radicals.

In the amination of the haloalkylated polymer, when a primary or secondary amine is used for the aminating agent, a weekly basic anion exchange resin is obtained, and when a tertiary amine is used, a strongly basic anion exchange resin is obtained. In order to promote the reaction, it is desirable to swell the haloalkylated polymer prior to the reaction. The swelling is carried out by soaking the polymer in a proper solvent such as benzene, toluene, ethylene dichloride, trichloroethane or tetrachloroethylene. The amine is used in the form of a free base. The reaction temperature is −25 to 150° C. The tertiary amine has the following general formula:

wherein $R_1$, $R_2$ and $R_3$ respectively represent any of alkyl, phenyl, benzyl, propynl, hydroxyalkyl and dihydroxyalkyl radicals. Typicals of these amines are trimethylamine, triethylamine, dimethylbenzylamine, dimethylaniline, dimethylaminopropine, dimethylaminoethanol, dimethylethanolamine, dimethylisopropanolamine, methyldiisopropanolamine, dimethylpropanolamine, dioctylethanolamine, 1-dimethylamino-2-3-propanediol, 1-dimethylamino-2,3-propanediol and diethylisopropanolamine. These are used as alone or as mixed.

The primary amine has the following general formula:

and the secondary amine has the following general formula:

wherein $R_1$ and $R_2$ are the same as mentioned above. Further, a compound having both primary amino group and secondary amine group such as polyalkylene and polyamine can be used. Typical of these amines are methylamine, dimethylamine, n-butylamine, isobutylamine, aniline, benzydine, o-, m- and p-toluidine, xylidine, naphthylamine, naphthalenediamine, benzylamine, dibenzylamine, phenylenediamine, benzylaniline, benzylethylamine, methylaniline, cyclohexylaniline, dicyclohexylamine, diethylenetriamine, triethylenetetramine, tetraethylenepentamine, 3,3′-iminobispropylamine and propyrenediamine.

As mentioned above, in the preparation of anion exchange resin having at least two dimensions each in excess of 1 cm. by using the base polymer matrix of monovinyl arene and polyolefinic compound, and plasticizer, with or without the addition of a polymerizing catalyst, inert material, or other monovinyl compound. Thus obtained large block polymer is worked into a product in the form of a sheet or in any other shape, the plasticizer is extracted from the polymer, and then said base polymer matrix is haloalkylated and aminated, in a swollen state with solvent, and thus uniform anion exchange resin having dimensions at least two dimensions each in excess of 1 cm. can be manufactured without cracks during the various process of polymerization, the introduction of ion exchange groups and the washing.

The following are examples of the present invention but are not to restrict the scope of this invention.

*Example 1*

An uniform solution was prepared by mixing 400 parts of newly distilled styrene, 20 parts of divinylbenzene, 30 parts of ethylvinylbenzene, 20 parts of butadiene, 120 parts of dibutylphthalate as a plasticizer and 0.4 part of benzoyl peroxide as a polymerizing catalyst. This mixture solution was subjected to solution polymerization in a pressure-tight polymerizing vessel at 80° C. for 12 hours and at 100° C. for 15 hours. The thus obtained polymer having size of 50 cm. x 50 cm. x 10 cm. had no cracks, and was transparent. Then sheets of base polymer matrix having dimensions of 0.7 mm. x 10 cm. x 10 cm. were prepared by cutting this block with planer and were put into an extraction vessel provided with a reflux condenser and a stirrer. 1000 parts of ethanol were put into this extraction vessel. The sheets were soaked in the reflux temperature of the solution for 24 hours and the plasticizer in the sheets was extracted. Then the sheets were again soaked in acetone at the reflux temperature of the solution for 24 hours and the residual plasticizer in the sheets was completely extracted. The sheets from which the plasticizer had been extracted were dried at 40° C. for 48 hours and the acetone in the sheets was driven out.

These sheets were put into a reaction vessel provided with a reflux condenser, a stirrer and guide plate to circulate the solution to promote the reaction between the sheets and reagent. 1000 parts of chloromethylether saturated with zinc chloride were put into the reaction vessel and chloromethylation was carried out at 25° C. for 24 hours. The sheets thus chloromethylated were taken out and were soaked in benzene. The zinc chloride and unreacted chloromethylether contained in the sheets were removed and the chloromethylated sheets were swollen by benzene. The chlorine content of these chloromethylated sheets was 18% by weight.

The sheets and 1000 parts of benzene were put into a reaction vessel provided with a reflux condenser, a stirrer, a thermometer and a trimethylamine gas inlet tube. This mixture was kept at 25° C. and anhydrous trimethylamine gas was blown into the mixture for an hour. Further, while trimethylamine gas was being introduced, the temperature of the aminating solution was raised to 50° C. in 0.5 hour. Trimethylamine gas was again blown in at 50° C. for 5 hours more. Thus amination was completed. The aminated sheets were put into 4 N. sodium chloride solution and were heated at 55° C. for 10 hours. Thus the benzene in the sheets was driven out. The excess trimethylamine in the sheets was neutralized by hydrochloric acid. Thus anion exchange sheets were obtained without cracks of these anion exchange sheets, the transference number of chlorine ion in 1.5 N. sodium chloride solution at 25° C. and specific electric conductivity in 0.5 N. sodium chloride solution at 25° C. were measured. The average values of ten sheets were as follows: the transference number, 92%, specific electric conductivity, $$5.1 \times mho \times cm.^{-1} \times 10^{-3}$$

What we claim:

Process for preparing anion exchange resin sheet comprising; the step of polymerizing in block form a solution mixture containing (1) 50–80% by weight of styrene, (2) 1–10% by weight of divinyl benzene, (3) 1–10% by weight butadiene, (4) 15–30% by weight of at least one member selected from the group consisting of dimethylphthalate, diethylphthalate, dibutylphthalate, dioctylphthalate, tricresylphosphate and polyethylene glycol; slicing the block form matrix into sheet form matrix; extracting the plasticizer from the sheet form matrix; chloromethylating the extracted sheet form matrix in such an amount that there exist an average of from 0.2 to 1.2 chloromethyl groups per aromatic nucleus in the resulting chloromethylated matrix; aminating said chloromethylated matrix with at least one member selected from the group consisting of trimethylamine, dimethylethanolamine, diethylenetriamine and tetraethylene pentamine in such an amount that there exist in the reaction mixture at least one mole of said amine for each chloromethylated group in said chloromethylated sheet form matrix.

References Cited in the file of this patent

UNITED STATES PATENTS

| | | |
|---|---|---|
| 2,636,851 | Juda et al. | Apr. 28, 1953 |
| 2,695,900 | Markarian et al. | Nov. 30, 1954 |
| 2,800,445 | Clarke | July 23, 1957 |